United States Patent

Happe

[15] 3,680,877
[45] Aug. 1, 1972

[54] CHUCK FOR DRILL OR LIKE
[72] Inventor: Reynold Happe, Jefferson City, Mo.
[73] Assignee: McGraw-Edison Company, Elgin, Ill.
[22] Filed: July 10, 1970
[21] Appl. No.: 53,941

[52] U.S. Cl. ................................................279/62
[51] Int. Cl. ...........................................B23b 31/12
[58] Field of Search ...................279/60, 62, 64, 1 B

[56] References Cited

UNITED STATES PATENTS 2,040,517  5/1936  Kopsch......................279/60 X
2,413,922  12/1946  Jeige et al......................279/64

FOREIGN PATENTS OR APPLICATIONS 967,522  0/1950  France............................279/60

*Primary Examiner*—Andrew R. Juhasz
*Assistant Examiner*—Z. R. Bilinsky
*Attorney*—Charles F. Lind

[57] ABSTRACT

A chuck for removably holding a drill bit or like tool element, including a conical sleeve and a plurality of jaws biased apart and away from the tool element against the inner sleeve face by compression springs, the sleeve being threaded onto a spindle and a thrust disc between the spindle and jaws operable upon sleeve rotation to shift the jaws axially of the sleeve to either tighten the jaws against or release the tool element, and a collar keyed to the spindle but movable axially along the spindle and journaled to the sleeve and having a socket for rotatably receiving a lock key which in turn has teeth that cooperates with teeth on the adjacent sleeve end operable to rotate the sleeve relative to the spindle.

In the tool art, a chuck frequently is used to releasably secure a drill bit or like tool element coaxially centered relative to a rotating spindle. In many instances, the cost of the chuck comprises a major portion of the total cost of the tool, particularly for example in a hand powered or low cost small electric drill. There are basically two types of chucks, one type having a key for mechanically tightening and loosening the chuck jaws relative to the tool element and the other type being only hand tightened. The key type chuck firmly holds the tool element and can be easily and quickly operated, but does have a relatively high cost. The hand tightened chuck is more economical than the key type chuck, but its tool element holding power and easiness of operation are not nearly as good.

3 Claims, 6 Drawing Figures

PATENTED AUG 1 1972
3,680,877
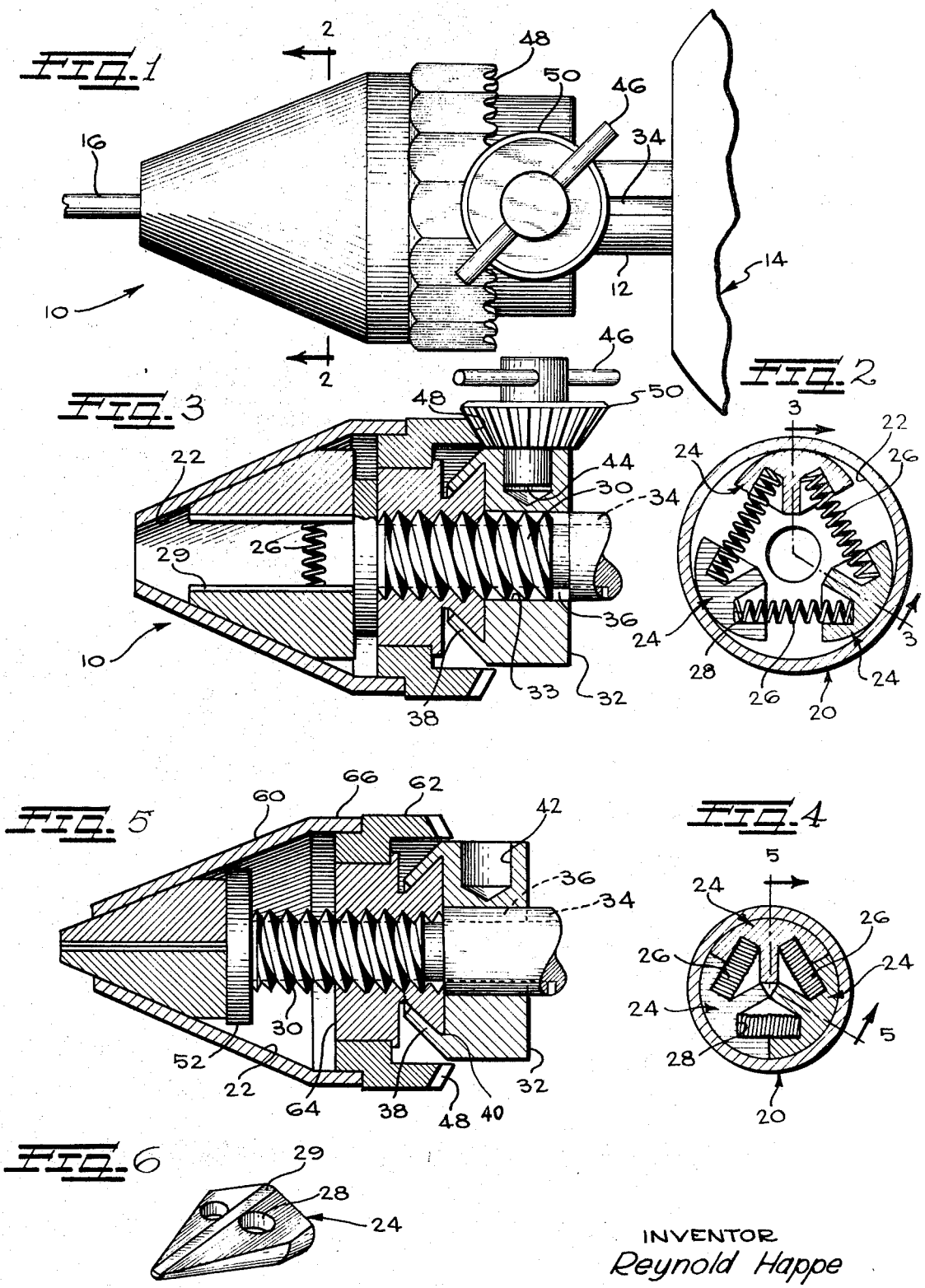
INVENTOR
Reynold Happe
Charles F. Lind
ATTY.

CHUCK FOR DRILL OR LIKE

This invention relates to, and an object of the invention is to provide, a chuck which is economical in cost and which can be readily fabricated without the need of elaborate machining equipment, comparable in fact in cost to a hand tightened chuck, but which has the benefits of and operates in a manner similar to a key type chuck.

Another object of this invention is to provide a gear type chuck having a conical sleeve which receives a plurality of jaws that are biased apart and against the inner sleeve wall by resilient springs, the sleeve being coaxially threaded onto a spindle, a collar keyed to the spindle but free to slide along the spindle and also being connected rotatably to the sleeve, and a key socket on the collar and key engaging teeth on the sleeve that permits a locking key to forceably rotate the sleeve relative to the spindle to force the jaws axially of the sleeve for gripping or releasing the tool element.

These and other objects will be more fully appreciated after reviewing the following specification, the accompanying drawing forming a part thereof, wherein:

FIG. 1 is a side elevational view of the disclosed chuck;

FIG. 2 is a sectional view as seen generally from line 2—2 in FIG. 1;

FIG. 3 is a sectional view as seen generally from line 3—3 in FIG. 2;

FIGS. 4 and 5 are views similar to FIGS. 2 and 3, respectively, except showing the chuck in a different operative position; and FIG. 6 is a perspective view of a jaw used in the disclosed chuck.

The particular chuck 10 shown in its preferred embodiment is connected to a spindle 12 or rotating output element of a drill 14 (only in portion being shown). The drill 14 can be mechanically or electrically powered, but in any case the rotational output of the spindle 12 must be transmitted to the chuck 10 to rotate the same. The chuck 10 in turn must securely hold a tool element 16 which when rotated provides the effective output of the unit.

Referring to the chuck 10 in greater detail, a sleeve 20 is formed with a conically converging bore 22 which bore receives three jaw members 24. The jaws have conically converging outer faces that engage the sleeve and compression springs 26 received in jaw sockets 28 separate the jaws from one another and hold them against the sleeve. The inner edge 29 of each jaw is straight and is adapted to engage the tool element.

The sleeve 20 is threaded on the threaded portion 30 of the spindle 12 so that rotation of the sleeve moves it axially along the spindle. A collar 32 is mounted adjacent the sleeve and has a bore 33 sufficiently large that receives and slides freely along the spindle 12. The spindle has axial keyways 34 and the collar 32 has a pair of tabs 36 that fit within the keyways and thereby preclude rotation of the collar on the spindle. The sleeve and the collar are held together axially but can rotate relative to one another by means of a cylindrical extension 38 on the collar being folded over and behind an enlarged rim 40 on the sleeve.

The collar 32 has a plurality of sockets 42 for receiving the boss end 44 of a conventional tightening key 46, and the adjacent end of the sleeve 20 has teeth 48 formed therein which cooperate with teeth 50 on the key 46. The sleeve, upon rotation of the key 46, is thus rotated relative to the collar 32 and since the collar is keyed to the spindle is also rotated relative to the spindle.

A thrust disc 52 is secured to the end of the spindle 12 and abuts the ends of the jaws 24. Thus upon sleeve rotation relative to the spindle, the disc 52 moves axially of the sleeve, either against the jaws to move them toward the sleeve neck to tighten the jaws against the tool element or away from the jaws to permit them to separate under the expanding effect of the compression springs 26 to release the tool element.

Referring now to specific details of construction the disclosed sleeve 20 actually is preferably formed of three separate components, 60, 62, 64 which can be fabricated separately and then press fitted, spot welded, or otherwise secured together to provide a very economical construction. The outer sleeve component 60 is shaped with the conically converging bore and has a cylindrical open large end 66. The end area 66 cooperates in a press fit or otherwise mechanically secured manner with a cylindrical surface formed on the intermediate key tooth component 62. The component 62 in turn has a hollow bore that is press fitted or otherwise mechanically secured onto the outer cylindrical surface of the component 64. The component fabrication of the sleeve makes it possible to economically form simple shaped components and to utilize in each component only that quality of metal that is needed to withstand the operating loads. In like manner the collar 32 can be separately formed and joined by fabrication to the sleeve component 64 by swagging an originally cylindrical lip 38 over the rim 40. The component surfaces expected to receive some abuse or wear during use, such as sliding collar lip 38, the inner sleeve bore, or the threads or teeth of elements 64 and 62 respectively, can be hardened by heat treating or the like for prolonged operating life.

The included angle of the sleeve bore is of the order of 45° to give a firm wedging action of the jaws against the tool element while yet providing that the jaws release from within the sleeve to remove the tool element. The conical surfaces of the jaws and sleeve preferably are such as to complement one another when the jaws are fully closed (FIGS. 4 and 5).

What is claimed is:

1. In a chuck combination having an externally threaded spindle, a sleeve threaded on the spindle and having a forwardly open converging bore into which a tool element is to be inserted, and jaws in the sleeve bore adapted upon sleeve rotation on the spindle to be urged axially of the sleeve either against the tool element for gripping same or away from the tool element for releasing same, the improvement comprising an annular collar received on the spindle and being sized to allow free axial movement along the spindle, means including an upstanding rim on the sleeve and a conical collar wall formed forwardly and inwardly over the sleeve rim operable to axially connect the sleeve and collar together while allowing relative rotation of same, integral tabs formed on the collar projecting within axial keyways formed on the spindle keying the collar against rotation on the spindle while still allowing axial collar movement thereon, the collar having at least one radial bore formed therein and the sleeve having teeth on the rearward end thereof operable for receiving and cooperating with a tightening key to impose rotation of the sleeve relative to the spindle upon rotation of the key.

2. A chuck improvement according to claim 1, further including the combination where the sleeve is formed of multiple components including a first annular component having tapered walls defining the converging bore, the second annular component having an interiorly threaded bore cooperating with the threaded spindle and having the upstanding rim thereon, and a third annular component having the teeth formed thereon, and means securing the components together.

3. A chuck improvement according to claim 1, wherein the cooperation of the conical collar wall and the upstanding sleeve rim are located radially inward of the teeth on the sleeve.

* * * * *